Oct. 30, 1951     F. HERZEGH     2,573,664

PNEUMATIC TIRE PACKAGE

Filed Oct. 18, 1947

Inventor
Frank Herzegh

Patented Oct. 30, 1951

2,573,664

UNITED STATES PATENT OFFICE 2,573,664

PNEUMATIC TIRE PACKAGE

Frank Herzegh, Shaker Heights, Ohio, assignor to The B. F. Goodrich Company, New York, N. Y., a corporation of New York Application October 18, 1947, Serial No. 780,647

6 Claims. (Cl. 206—46)

This invention relates to the packaging of pneumatic tires for shipment and storage.

Heretofore, in the packaging of pneumatic tire casings, it has been customary to apply a helical wrapping of paper tape about the casing, generally by the use of machines which have rotated the tire while the paper tape was wound thereon by a rotating shuttle. The tension of the paper and the pressure applied by the machine during wrapping has forced the bead portions of the tire casing into engagement with each other or at least closer together than in their seated position when mounted on a wheel rim. Furthermore, the practice of stacking tire casings on top of each other in storage has caused flattening of the tire casings laterally of their axes whether tape wrappings had been applied to the casings or not, thereby forcing the bead portions of the tire into closer spacing if not into actual contact with each other.

Although the tire casings have been fully vulcanized, the rubber or other rubber-like material of which they are composed is subject to permanent set when pressure is applied thereto over a period of time. It is desirable to have the tires reach the consumer in a condition where the bead portions of the tire casing are free from damage by distortion and are spaced by an amount equal to the space between them when seated on the wheel rim. This is particularly important in the case of tubeless tire casings in which seating of the bead portions of the casing against the wheel rim is depended upon to maintain pressure within the casing as initial seating of the bead portions of the casing upon the rim seats facilitates inflation.

It is an object of the present invention to provide for maintaining the bead portions of a tire casing in properly spaced-apart relation.

Other objects are to protect the bead portions from contact with each other, to provide a package having light weight combined with strength, to provide a simple and attractive packaged article, and to provide spacing means adapted to be retained in position within the tire casing.

These and other objects will appear from the following description and the accompanying drawings.

Figure 1:
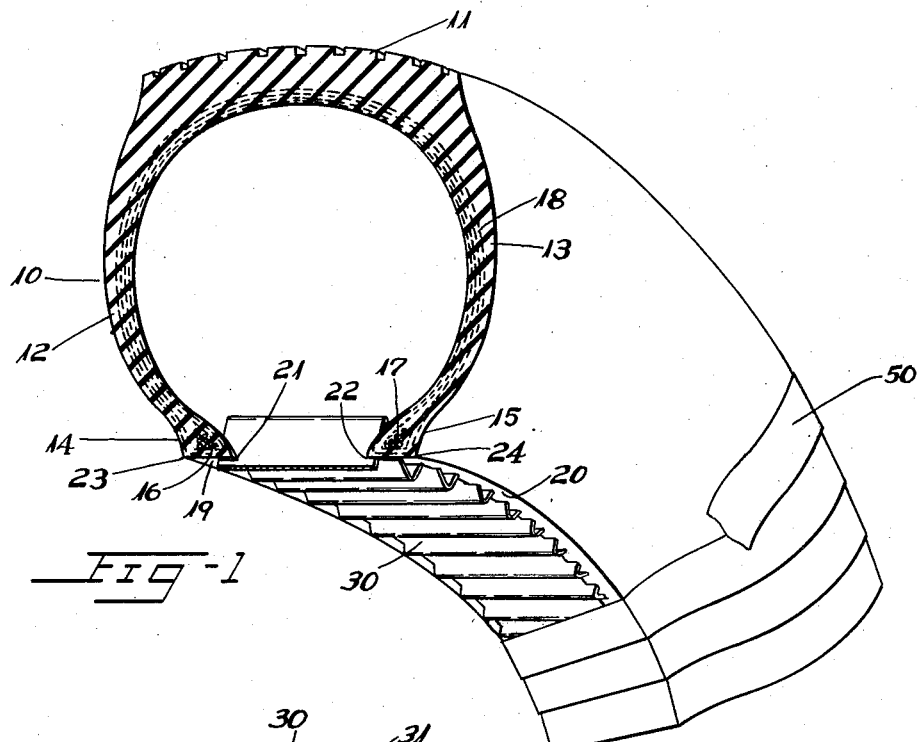
Fig. 1 is a perspective view of a portion of a tire casing packaged in accordance with and embodying the invention, parts being broken away.

Referring to the drawings, which illustrate an embodiment of the invention, the numeral 10 designates a pneumatic tire casing having the usual tread 11, side walls 12, 13 and bead portions 14, 15. The bead portions, as usual, have bead-reinforcing cores 16, 17 about which reinforcing layers 18 of fabric or cord are interlocked. These bead portions have annular rim seating surfaces 19, 20 which terminate laterally at one side in annular toe portions 21, 22 facing toward each other, and at the other side in heel portions 23, 24 at the outer side faces of the casing.

For spacing the bead portions of the tire casing, a strip 30 of stiff sheet material, such as cardboard, is folded in alternately opposite directions along lines 31, 32 parallel to each other and extending crosswise of the strip, the strip being of such width as to space the bead portions of the tire casing from each other by an amount equal to and preferably greater than the distance between them when seated on the rim. The strip is placed between the bead portions of the tire so that the bead portions abut against the strip material between its folds.

For holding the strip in position between the bead portions of the casing, the strip 30 is preferably notched at the ends of its panels defined by the folds, as at 33 and the notches are preferably of such shape as to fit over the toes of the bead portions in close conformity thereto. Where the notches are of non-symmetrical shape, as in the illustrated embodiment, notches in successive panels along the strip are formed of opposite hand in successive panels, any two adjacent notches being symmetrical about a fold line therebetween. The notches are preferably so proportioned that one side of each notch conforms to the rim-seating surface of the tire casing and the other side conforms to the inner surface of the tire just above the toe of the bead.

Figure 2:
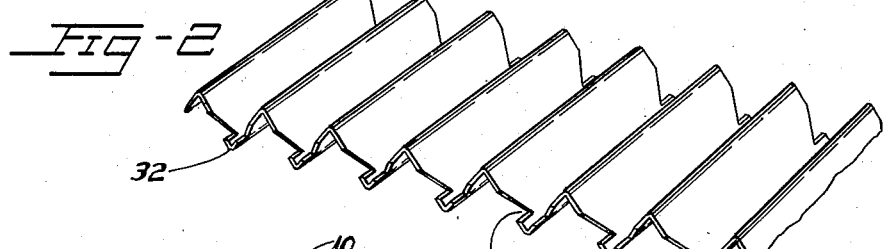
Fig. 2 is a perspective view of the spacing means, parts being broken away.
Figures 3, 4:
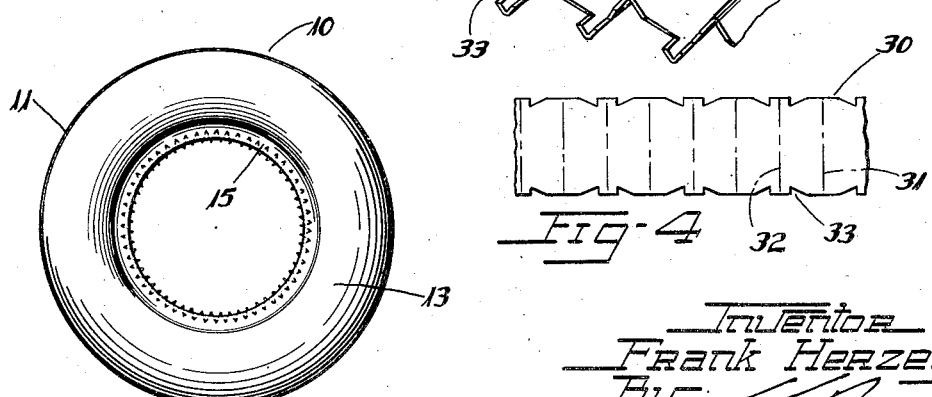
Fig. 3 is a side view of a tire casing with the spacing means in place.
Fig. 4 is a plan view of the spacing means before being folded.

In use, the strip 30 folded as illustrated in Fig. 2, is placed between the bead portions of the tire casing with its notches straddling the toes of the bead portions at opposite sides of the tire. Although the strip may be glued or stapled to provide an annular separator, that is not necessary as the notches prevent displacement of the strip. A helical wrapping of paper tape 50 may be applied to the tire to completely enclose the tire casing and hold the strip 30 in place. This is not necessary, however, as the notches engaging the bead portions will hold the spacer in place.

Variations may be made without departing from the scope of the invention as it is defined by the following claims.

I claim:

1. A tire package comprising a tire casing having spaced-apart bead portions, and expendible spacing means extending between said bead portions to hold the bead portions in spaced relation, said means comprising a strip of stiff sheet material arranged circumferentially of the tire, said strip being wider than the distance between the bead portions of the tire when the tire is mounted for use and having folds extending laterally across the same to stiffen it, and circumferentially spaced-apart means at the margins of the strip seating astride the bead portions of the tire for holding the strip in position.

2. A tire package comprising a tire casing having spaced-apart bead portions, and expendible spacing means extending between said bead portions to hold the bead portions in spaced relation, said means comprising a strip of stiff sheet material wider than the normal spacing of the bead portions of the tire and arranged circumferentially of the tire between said bead portions, said strip having cross notches formed in its circumferential margins to receive the toes of said bead portions for holding the strip in position between the bead portions of the tire casing and said strip being sinuously disposed between said bead portions to align the notches with said bead portions.

3. A tire package comprising a tire casing having spaced-apart bead portions, and expendible spacing means extending between said bead portions to hold the bead portions in spaced relation, said means comprising strip stiff sheet material wider than the normal spacing of the bead portions of the tire and arranged circumferentially of the tire, said strip having folds along the same to stiffen it, the folds in said strips defining a succession of panels and the margins of the strip at the panels having notches conforming in shape to the adjacent bead portions.

4. A tire package suitable for handling with the bead portions of the tire maintained in spaced-apart relation, said package comprising the combination of a tire casing having spaced-apart bead portions presenting toes directed toward each other, and an expendible circumferentially flexible and laterally stiff spacing member of paper material disposed between and seated against said bead portions at said toes, said spacing member having circumferentially spaced-apart means at its lateral margins for receiving said toes of the bead portions in overlying relation of the toes and members to hold the member in place with the bead portions of the casing laterally spaced-apart from their positions when seated on a wheel rim.

5. A tire package suitable for handling with the bead portions of the tire maintained in spaced-apart relation, said package comprising the combination of a tire casing having spaced-apart bead portions, and an expendible circumferentially flexible and laterally stiff spacing member of paper material disposed between and seated against said bead portions, said spacing member having spaced-apart reverse folds extending laterally thereof to stiffen it and defining a succession of panels between said folds, said panels having means at their lateral margins for receiving said bead portions with portions of the spacing member disposed radially inward of and radially outward of the toes of said bead portions and embracing the same to hold the member in place with the bead portions of the casing laterally spaced apart from their positions when seated on a wheel rim.

6. A tire package suitable for handling with the bead portions of the tire maintained in spaced-apart relation, said package comprising the combination of a tire casing having spaced-apart bead portions presenting toes directed toward each other, an expendible circumferentially flexible and laterally stiff spacing member of paper material disposed between and seated against said bead portions at said toes, and a wrapping about said casing and said spacing member holding them in assembled relation, said spacing member having circumferentially spaced-apart means at its lateral margins for receiving said toes of the bead portions in overlying relation of the toes and member to hold the member in place with the bead portions of the casing laterally spaced-apart from their positions when seated on a wheel rim.

FRANK HERZEGH.

REFERENCES CITED

The following references are of record in the file of this patent:

UNITED STATES PATENTS

| Number | Name | Date |
|---|---|---|
| 1,388,840 | Angier | Aug. 30, 1921 |
| 1,414,052 | Smith | Apr. 25, 1922 |
| 1,504,733 | Angier et al. | Aug. 12, 1924 |
| 2,158,747 | Doros | May 16, 1939 |
| 2,348,084 | MacChesney et al. | May 2, 1944 |
| 2,400,930 | Herzegh | May 28, 1946 |

FOREIGN PATENTS

| Number | Country | Date |
|---|---|---|
| 145,341 | Great Britain | July 2, 1920 |
| 671,003 | Germany | Jan. 30, 1939 |